United States Patent Office 3,278,492
Patented Oct. 11, 1966

3,278,492
POLYMERIZATION OF ORGANIC ISOCYANATES USING AN ORGANOMETALLIC CATALYST
Sheldon Herbstman, Bronx, N.Y., assignor to Stauffer Chemical Company, New York, N.Y., a corporation of Delaware
No Drawing. Filed Jan. 13, 1964, Ser. No. 337,137
6 Claims. (Cl. 260—77.5)

This invention relates to the polymerization of organic isocyanates and in particular to the production of isocyanurate polymers. Still more particularly the invention is concerned with an improved process for realizing isocyanurate polymers based on a new catalyst system.

It is well known that organic isocyanates undergo polymerization to form a cyclic ring structure in accordance with the following scheme

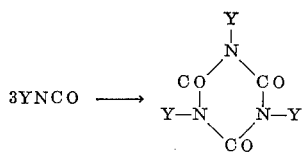

wherein Y is an organic hydrocarbon radical or residue either aliphatic or aromatic. The reaction is commonly carried out in the presence of a basic catalyst, the most common types being sodium acetate, organic tertiary amines in the presence of ethanol and trisubstituted phosphorus derivatives such as triethylphosphine. In the case of a monofunctional isocyanate, there is formed a simple cyanuric acid derivative in which each ring nitrogen has attached thereto the organic residue represented by Y in the formula and derived from the monomeric isocyanate starting material. Where the isocyanate monomer contains a plurality of isocyanate functions, there is produced a more complex polymeric system consisting of a network of cyanuric acid rings connected at their nitrogen atoms through intervening carbon chains or bridges provided by the hydrocarbon residue of the polyfunctional isocyanate monomer.

It has now been discovered that the polymerization of organic isocyanates is greatly enhanced and facilitated by using as a catalyst for the polymerization reaction an organometallic compound of the type represented by the following chemical formulae:

(I) $R_1R_2R_3M=O$ (II) $R_1R_2R_3M(OR)_2$ and (III) $R_1R_2R_3M(OCOR)_2$ wherein $R_1$, $R_2$ and $R_3$ refer to hydrocarbon radicals of the alkyl and aromatic type and having from 1 to 12 carbon atoms, e.g. methyl, ethyl, n-propyl, isobutyl, n-butyl, n-pentyl, n-hexyl, isohexyl, n-heptyl, isooctyl, n-octyl, n-decyl, n-dodecyl, phenyl, biphenylyl, alpha-naphthyl, beta-naphthyl and the like, it being understood that at least two of $R_1$, $R_2$ and $R_3$ are always alkyl and M represents antimony or arsenic.

In carrying out the process of the invention, generally excellent results are achieved by contacting the organic isocyanate with the organometallic catalyst whereby polymerization immediately begins, it being unnecessary to use elevated temperatures although the application of heat accelerates the reaction. The use of solvents may be resorted to and in this connection, it has been our finding that relatively inert normally liquid organic solvents are preferable, such as lower saturated aliphatic ethers, esters, hydrocarbons and the like. In general, we prefer to conduct the polymerization reaction in the absence of extraneous solvents.

Although the quantity of organometallic catalysts is not especially critical, optimum results are achieved by employing a molar ratio of catalyst to isocyanate function varying from about 50 to 1 to about 100 to 1. However, such a range is merely illustrative of the optimum conditions of carrying out the process of the invention, and is not to be taken as imposing any limitation or restriction thereon.

The organometallic compounds used as catalysts in our new process of polymerizing organic isocyanates are known chemical entities, the preparation and description of which is to be found in the chemical literature, and in this connection reference is made to such well known journals as Journal of American Chemical Society, Journal of the Chemical Society, Berichte, and the like. A more specific account of the aforesaid compounds is given in Die Chemie der Metall-Organischen Verbindungen by E. Krause and A. Grosse, published by Edward Brothers, Ann Arbor, Mich. (1943).

In preparing the hereindescribed isocyanurate trimers and polymers, the monomeric isocyanate can be replaced by substances which are precursors of an isocyanate. For example, a uretedione of the formula

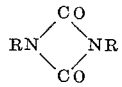

wherein R designates an aryl group, substituted or not, undergoes smooth transformation into an isocyanate trimer when heated with the organometallic catalyst compounds of the invention. Since the reactivity of the uretedione undergoes trimer formation at a slower rate than the free isocyanate monomers, we have employed mixtures of these two starting materials thereby producing isocyanurate trimers having a diversity of substituents, that is to say, some of the substituents are provided by the uretedione while others are provided by the free isocyanate monomer. By proper choice of the mixed starting materials, it is possible to prepare a wide variety of unsymmetrical isocyanurate trimers whose physical and chemical properties range over a larger area than the isocyanurates having identical substituents affixed thereto.

Isocyanate polymers are important and valuable chemicals which have a wide variety of uses. For instance, the simple trisubstituted isocyanurates are effective as plasticizers, solvents and intermediates in making fluorescent dyes, optical bleaches and insecticides. The higher molecular weight isocyanurate polymers, i.e. derived from polyfunctional isocyanate monomers, are members of an interesting cross-linked polymer system having free isocyanate functions useful in the manufacture of polyurethane foams and plastics.

Reference is now made to the following examples which are inserted for the purpose of illustrating the invention, but it is to be understood that various modifications thereof will be apparent to those skilled in the art without departing from the spirit or scope of the invention.

*Example 1*

0.4 g. (0.0012 mole) of tributylantimony oxide was added to 15.0 g. (0.126 mole) of phenyl isocyanate. There ensued immediately an exothermic reaction and the mixture became quite viscous and after about 15 minutes solidification occurred. The solid was triturated with pentane and then allowed to dry in the open air. There was obtained 14.9 g. of triphenyl isocyanurate melting at 278° C. After crystallization from ethanol, the purified product melted at 281° C.

Employing the general procedure given in Example 1, the following isocyanurate trimers were prepared:

| Example No. | Catalyst | —NCO[1] | Percent Yield (Trimer) | Time | Temp., °C. | Amount, Grams Catalyst Used |
|---|---|---|---|---|---|---|
| 2 | (n-C$_4$H$_9$)$_3$SbO | Phenyl | 99.5 | 15 min | 28 | 0.40 |
| 3 | (n-C$_4$H$_9$)$_3$SbO | m-Chlorophenyl | 100 | 15 min | 28 | 0.40 |
| 4 | (n-C$_4$H$_9$)$_3$SbO | Ethyl | 77 | 8 hrs | Reflux | 0.40 |
| 5 | (n-C$_4$H$_9$)$_3$SbS | Phenyl | 69 | 60 min | 28 | 5.0 |
| 6 | (n-C$_4$H$_9$)$_3$Sb(OC$_2$H$_5$)$_2$ | m-Chlorophenyl | 100 | 20 min | 28 | 0.40 |
| 7 | (n-C$_4$H$_9$)$_3$Sb(OCOC$_6$H$_5$)$_2$ | do | 51 | 96 hr | 28 | 0.40 |
| 8 | (C$_2$H$_5$)$_3$AsO | Phenyl | 100 | 15 min | 28 | 0.20 |
| 9 | (iso-C$_4$H$_9$)$_3$AsO | m-Chlorophenyl | 100 | 15 min | 28 | 0.10 |
| 10 | 1-phenyl-1-oxo-arsolane (CH$_2$CH$_2$CH$_2$CH$_2$As(C$_6$H$_5$)=O) | Phenyl | 51 | 1 hr | 100 | 0.40 |
| 11 | (n-C$_4$H$_9$)$_3$Sb(OCOCH$_3$)$_2$ | m-Chlorophenyl | 100 | 72 hr | 28 | 0.40 |
| 12 | (n-C$_4$H$_9$)$_3$SbO | m-Nitrophenyl | 71 | | | 0.40–0.80 |
| 13 | (n-C$_4$H$_9$)$_3$Sb(OC$_2$H$_5$)$_2$ | o-Methoxyphenyl | 93 | | | 0.40–0.80 |
| 14 | (n-C$_4$H$_9$)$_3$SbO | n-Butyl | 69 | | | 0.40–0.80 |

[1] The amount of isocyanate monomer used in all cases was 15.0 g.

*Example 15*

0.50 g. (0.0013 mole) or tri-n-butylantimony diethoxide was added in two equivalent portions at one-half hour intervals to 25.0 g. (0.144 mole) of toluylene-2,4-diisocyanate while maintaining thorough stirring. After standing overnight at room temperature, the reaction mixture was transformed into a white solid which was isolated in the form of a free-flowing white powder which did not melt at 300° C. Infrared absorption spectrum indicated the presence of a polyisocyanurate configuration containing approximately 40% free isocyanate groups.

*Example 16*

The procedure as above given for Example 15 was repeated but replacing the tri-n-butylantimony diethoxide of the example with triethylarsenic oxide. In general, the results, i.e. yield of product and its chemical construction, were in consonance with those of Example 15.

*Example 17*

A mixture of 0.26 g. (0.001 mole) of tri-isobutylarsenic oxide and 16.8 g. (0.10 mole) of hexamethylene diisocyanate were refluxed for three hours. The reaction mixture was allowed to cool, at which point it was transformed into a rubbery solid, which on further standing became brittle. The melting point is in excess of 300° C. On subjection to infrared analysis, the product was shown to contain cross-linked polyisocyanurate having about 20% free isocyanate groups.

*Example 18*

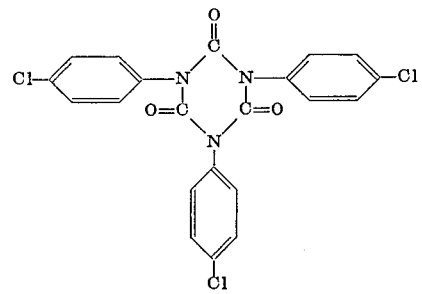

A solution of 15.0 g. (0.063 mole) of m-chlorouretedione and 0.40 g. (0.0013 mole) of tri-n-butylantimony oxide in benzene was refluxed for seven hours, cooled to room temperature followed by distillation to remove benzene and volatile components. There was obtained a residual white solid which was purified by crystallization from ethanol. The resulting product melted at 220° C. and was shown to have the above depicted structure.

I claim:
1. The method of preparing an isocyanate polymer having at least one isocyanate ring per polymeric unit which comprises polymerizing an organic isocyanate in the presence of at least a catalytic amount of an organometallic compound selected from the class consisting of $$R_1R_2R_3M=O$$
$$R_1R_2R_3M(OR)_2$$
and
$$R_1R_2R_3M(OCOR)_2$$

wherein $R_1$, $R_2$ and $R_3$ are selected from the class consisting of alkyl and aromatic radicals having from 1 to 12 carbon atoms, any two of $R_1$, $R_2$ and $R_3$ always being alkyl and M is selected from the class consisting of antimony and arsenic.

2. The method of preparing an isocyanurate which comprises polymerizing a monofunctional organic isocyanate in the presence of at least a catalytic amount of an organometallic compound selected from the class consisting of $$R_1R_2R_3M=O$$
$$R_1R_2R_3M(OR)_2$$
and
$$R_1R_2R_3M(OCOR)_2$$

wherein $R_1$, $R_2$ and $R_3$ are selected from the class consisting of alkyl and aromatic radicals having from 1 to 12 carbon atoms, any two of $R_1$, $R_2$ and $R_3$ always being alkyl and M is selected from the class consisting of antimony and arsenic.

3. The method of preparing a cross-linked isocyanurate polymer which comprises polymerizing an organic isocyanate having at least two isocyanate functions in the presence of at least a catalytic amount of an organometallic compound selected from the class consisting of $$R_1R_2R_3M=O$$
$$R_1R_2R_3M(OR)_2$$
and
$$R_1R_2R_3M(OCOR)_2$$

wherein $R_1$, $R_2$ and $R_3$ are selected from the class consisting of alkyl and aromatic radicals having from 1 to 12 carbon atoms, any two of $R_1$, $R_2$ and $R_3$ always being alkyl and M is selected from the class consisting of antimony and arsenic.

4. The method according to claim 2 wherein the monofunctional organic isocyanate is an aliphatic isocyanate.

5. The method according to claim 3 wherein the organic isocyanate is an arene diisocyanate.

6. The method according to claim 1 wherein the polymerization is carried out at room temperature.

References Cited by the Examiner
UNITED STATES PATENTS
3,205,201   9/1965   Friedrich _____ 260—77.5

LEON J. BERCOVITZ, *Primary Examiner.*

M. C. JACOBS, *Assistant Examiner.*